July 4, 1944.   G. K. GAUMER   2,352,623
BUNDLER AND DISCHARGE ASSEMBLY FOR WIRE PRODUCTS MACHINES
Original Filed Aug. 30, 1940
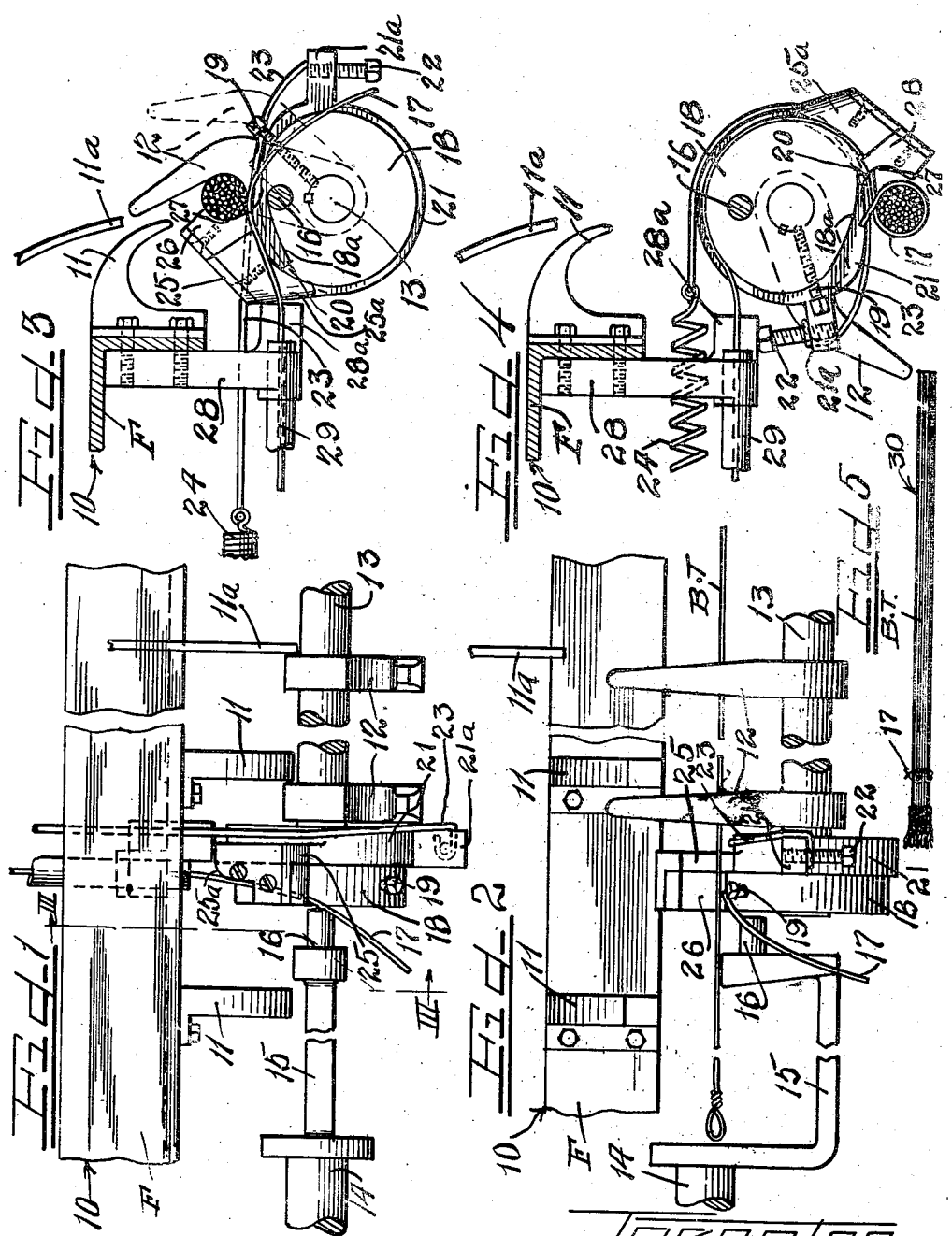
Inventor
George K. Gaumer.
by Charles W. Hills Attys.

Patented July 4, 1944

2,352,623

UNITED STATES PATENT OFFICE 2,352,623

BUNDLER AND DISCHARGE ASSEMBLY FOR WIRE PRODUCTS MACHINES

George K. Gaumer, Sterling, Ill., assignor to Northwestern Steel and Wire Company, Sterling, Ill., a corporation of Illinois Original application August 30, 1940, Serial No. 354,784. Divided and this application June 9, 1943, Serial No. 490,183

3 Claims. (Cl. 100—31)

This invention relates to mechanisms for automatically collecting, tying together, and discharging wires or strip products made on a wire-fabricating machine.

Specifically, the invention relates to an improved wrapping strand feeding and cutting mechanism for a bale tie machine.

This application is a division of my copending application entitled: "Counter assembly for wire products machine," Serial No. 354,784, filed August 30, 1940.

While the invention will hereinafter be specifically described in connection with a machine for making bale ties, it should be understood that the invention is, in general, adapted for the automatic collecting, tying together, and discharging of a large variety of products, particularly elongated strands or strips such as, for example, wires, ribbons, rods and the like.

In the high-speed fabrication of wire products such as bale ties, it is highly desirable that the fabricating machine discharge finished products in bundles. It is also highly desirable that the collecting, bundling-together, and discharging of bundles be entirely automatic, in order that one operator can look after a number of machines.

Heretofore bale tie machines merely discharged the finished bale ties onto a collecting platform, and it was necessary to manually count, bundle together, and move the counted and bundled-together bale ties to another machine which applied a commercial wrapping around a desired number of bundles. The manual sorting out and bundling of the long bale ties was awkward, time-consuming and expensive.

The present invention eliminates this manual effort and the bale tie machine discharges bundled bale ties. It is, then, merely necessary to move any desired number of the bundles into the final wrapping machine if the bundle is to be further wrapped.

It is, then, an object of this invention to provide apparatus for automatically bundling and discharging bundled wire products.

A further object of the invention is to provide a wire product machine with mechanism for automatically tying together a plurality of products fabricated by the machine.

A still further object of the invention is to provide attachments for a bale tie machine for converting the machine to deliver bundles of bale ties instead of single bale ties.

A specific object of the invention is to provide a cutting and wrapping strand-feeding mechanism for a wire products fabricating machine.

Other and further objects of the invention will be apparent to those skilled in the art from the following description of the attached sheet of drawings which, by way of preferred example only, illustrates one embodiment of the invention.

On the drawing:

Figure 1 is a broken, fragmentary, top plan view of a portion of a bale tie machine illustrating the bundling and discharge assembly of this invention.

Figure 2 is a broken, fragmentary front elevational view of the assembly shown in Figure 1.

Figure 3 is a vertical cross-sectional view, with parts in elevation, taken along the line III—III of Figure 1, illustrating the assembly in bundling position.

Figure 4 is a view similar to Figure 3 illustrating the assembly in discharge position.

Figure 5 is a side elevational view of a bundle of bale ties produced by the assembly of Figures 1 to 4.

As shown on the drawing:

In Figures 1 to 4 the reference numeral 10 indicates generally a portion of a bale tie making machine including a frame member F in the form of an angle beam, having a top horizontal leg and a front vertical leg. Guide brackets 11 are mounted on the vertical leg of the frame F and cooperate with guide rods 11a to guide bale ties such as B. T. from the machine 10 to fall by gravity into collector arms 12 mounted on a shaft 13 of the machine.

A wrapping shaft 14 is provided on the machine in spaced relation from the end of the shaft 13 and carries a U-shaped wrapping finger 15 on the end thereof adapted to clear the looped ends of the bale ties B. T. The right-hand end of the finger 15 carries a wrapping pin 16 for acting on a wrapping wire or strand 17 in a manner to be more fully hereinafter described.

The collector arms shaft 13 has a disk 18 secured thereon by means of a locking pin 19 directly in front of the wrapping pin 16. The disk 18 will therefore rotate with the shaft 13. The disk 18 has a cam surface 18a thereon defining a cutting shoulder 20 on the periphery of the disk.

A disk 21 is loosely mounted on the shaft 13 to the right of the disk 18 and has a leg 21a projecting from the periphery thereof. An adjustable stop bolt 22 is threaded in the leg 21a and serves as an anchor for the end of a rawhide or other flexible material strip or strand 23. The other end of the rawhide strip 23 is anchored to a tension spring 24 which is carried by the frame of the machine and which serves to pull the floating disk 21 in a counter-clockwise direction to the position shown in Figure 3.

The floating disk 21 has a head portion 25 which overlaps the disk 18 as shown in Figure 2. This head portion 25 carries a cutter block 26 over the periphery of the disk 18. The cutter block 26 and head 25 define a segmental cylindrical recess 27 adapted to receive the bale ties therethrough. A guide 11 guides the ends of the bale ties into this recess 27.

A bracket 28 is bolted on the frame F and depends downwardly therefrom into adjoining relation with the disk 21. An abutment 28a is formed on this bracket 28 for preventing retraction of the head 25 beyond the position shown in Figure 3 and for acting on the stop bolt 22 as shown in Figure 4.

This bracket 28 also carries a tube 29 through which the wrapping wire 17 is fed from a spool or other suitable source (not shown) mounted on the machine. The wrapping wire 17 is initially guided over the cutting portion 20 of the driven disk 18 and is directed by a cam face 25a on the side of the head 25 into the path of the wrapping pin 16 as shown in Figures 1 and 2.

When a predetermined number of bale ties B. T. have been collected in the collector arms 12, the shaft 13 is rotated to move the collector arms 12 from the position shown in dotted lines in Figure 3 to the position shown in solid lines. This causes the collector arms to cooperate with the recess 27 of the head 25 and cutter block 26 to form the bale ties into a round bundle. In the meantime, the shaft 14 is rotated to spin the wrapping pin 16 through two complete revolutions to wrap the leading end of the wire 17 around the bale ties B. T. Rotation of the shaft 13 is then reversed to drive the disk 18 in a clockwise direction. The disk 18 continues to rotate at a slower speed in the clockwise direction, and this causes the cutting shoulder 20 to clamp the wire 17 against the cutting block 26 thus pulling the wire through the tube 29 and moving the floating disk 21 with the disk 18 against the tension of the spring 24.

The floating disk 21 continues to rotate with the disk 18 until the stop bolt 22 strikes the abutment 28a as shown in Figure 4. Upon striking the abutment, the floating disk 21 is stopped, but the disk 18 continues to rotate for shearing off the wire between the cutting block 26 and the cutting shoulder 20 as shown in Figure 4. The wire therefore no longer is clamped between the disk 18 and the cutting head 26, and the spring 24 can therefore pull the disk 21 back into the position shown in Figure 3 with the head 25 abutting the top portion of the abutment 28a. When this happens, however, sufficient wire has been pulled through the tube 29 to leave a leading end in the position shown in Figures 1 and 2 for the next wrapping operation.

The severed wire has been wrapped around the bale ties as shown in Figure 4 for two complete revolutions, and the collector arms 12 have been moved to a dump position as also shown in Figure 4, so that the bale tie bundle 30 of Figure 5 can drop by gravity out of the machine.

From the above description it will be understood that the invention provides an assembly for bundling a plurality of bale ties and for discharging a bale tie bundle out of a bale tie machine.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a wire products fabricating machine, a wire products collecting and dumping mechanism, a cutter movable with said mechanism, a member floatingly mounted adjacent said cutter and having a head portion overlapping the cutter adapted to wedge a strand of material between said cutter and said head portion to wrap the strand around the cutter upon movement of said collecting and dumping mechanism, a stop member for arresting movement of the floating member with the cutter after a predetermined amount of movement therewith to effect severing of the wedged strand, and means for reversely rotating said floating member relative to the cutter to carry the head freely over a predetermined length of unsevered strand material for subsequent wedging against a new portion of the strand.

2. A wrapping strand feeding and cutting mechanism for a wire products fabricating machine which comprises a rotatable cutter, a member floatingly mounted adjacent said cutter and having a head portion overlapping the cutter to wedge a strand of wrapping material between the cutter and head, means for rotating the cutter whereby the wedged wrapping strand will rotate the floating member with the cutter to effect a feeding of strand material around the cutter, a stop member for arresting movement of the floating member with the cutter after a predetermined amount of movement therewith to effect severing of the wedged strand, and means for reversely rotating said floating member relative to the cutter and back over a predetermined length of unsevered strand material for subsequently wedging against a new portion of the strand.

3. A cutting and wrapping strand feeding mechanism for a bale tie machine which comprises a rotatable cutter, a member floatingly mounted adjacent said cutter and having a head portion overlapping the cutter for wedging wrapping strand material against the cutter, means for rotating the cutter to pull the head of the floating member into wedging engagement with strand material disposed over the cutter for feeding the strand material around the cutter, a stop member for arresting movement of the floating member with the cutter to effect severing of the wedged strand, and means positively connected to said floating member for returning the floating member to its starting position for subsequent wedging against the new portion of the strand.

GEORGE K. GAUMER.